(12) United States Patent
Tamosiunas

(10) Patent No.: US 11,843,620 B1
(45) Date of Patent: *Dec. 12, 2023

(54) STATELESS SYSTEM TO ENABLE DATA BREACH

(71) Applicant: UAB 360 IT, Vilnius (LT)

(72) Inventor: Edvinas Tamosiunas, Kaunas (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,880

(22) Filed: Oct. 12, 2022

Related U.S. Application Data

(63) Continuation of application No. 17/961,860, filed on Oct. 7, 2022.

(51) Int. Cl.
*H04L 9/40* (2022.01)

(52) U.S. Cl.
CPC .................. *H04L 63/1416* (2013.01)

(58) Field of Classification Search
None
See application file for complete search history.

(56) References Cited

U.S. PATENT DOCUMENTS

| | | | | |
|---|---|---|---|---|
| 6,253,203 B1 * | 6/2001 | O'Flaherty | ......... | G06F 21/6245 707/999.102 |
| 6,532,459 B1 * | 3/2003 | Berson | ................. | G06F 16/951 |
| 7,032,240 B1 * | 4/2006 | Cronce | ................. | H04L 9/0838 705/51 |
| 7,594,277 B2 * | 9/2009 | Zhang | ................ | G06F 16/313 726/30 |
| 8,181,036 B1 * | 5/2012 | Nachenberg | ........ | H04L 63/1416 709/224 |
| 8,254,698 B2 * | 8/2012 | Kantor | .................... | G06F 18/22 382/209 |
| 8,495,384 B1 * | 7/2013 | DeLuccia | ................ | G06F 21/10 726/28 |
| 8,635,373 B1 * | 1/2014 | Supramaniam | .......... | H04L 63/08 709/248 |
| 9,032,531 B1 * | 5/2015 | Scorvo | ................ | G06F 21/6254 726/25 |
| 9,077,747 B1 * | 7/2015 | Chen | ................... | H04L 63/1433 |
| 9,736,147 B1 * | 8/2017 | Mead | ....................... | G06F 21/31 |
| 9,967,236 B1 * | 5/2018 | Ashley | ..................... | H04L 63/20 |
| 10,970,393 B1 * | 4/2021 | Stiles | ..................... | G06F 21/554 |
| 11,170,130 B1 * | 11/2021 | Blumberg | ............... | G06F 21/64 |
| 11,223,636 B1 * | 1/2022 | Angara | ................ | H04L 9/3247 |

(Continued)

*Primary Examiner* — Kambiz Zand
*Assistant Examiner* — Mahabub S Ahmed
(74) *Attorney, Agent, or Firm* — The Pattani Law Group

(57) ABSTRACT

A method including determining, by an infrastructure device, a breach database including breach information indicating breached data that is compromised due to a data breach; calculating, by the infrastructure device, a hash of the breached data that is compromised due to the data breach; receiving, by the infrastructure device from the user device, a hash of private data associated with the user device; comparing, by the infrastructure device, the hash of the private data with the hash of the breached data; and transmitting, by the infrastructure device when the hash of the private data matches the hash of the breached data, a notification to the user device indicating that the private data associated with the user device is compromised due to the data breach is disclosed. Various other aspects are contemplated.

20 Claims, 7 Drawing Sheets

(56) References Cited

U.S. PATENT DOCUMENTS

| | | | | |
|---|---|---|---|---|
| 11,277,401 | B1* | 3/2022 | Yoskowitz | H04L 63/083 |
| 11,438,378 | B1* | 9/2022 | Dell'Amico | H04L 9/3236 |
| 11,558,409 | B2* | 1/2023 | Endler | H04L 63/1425 |
| 2003/0177361 | A1* | 9/2003 | Wheeler | G06Q 20/00 |
| | | | | 713/176 |
| 2003/0223586 | A1 | 12/2003 | Green et al. | |
| 2006/0063511 | A1* | 3/2006 | Shima | H04L 63/08 |
| | | | | 455/410 |
| 2006/0224742 | A1* | 10/2006 | Shahbazi | H04L 63/20 |
| | | | | 709/226 |
| 2007/0130477 | A1* | 6/2007 | Barbian | G06F 21/78 |
| | | | | 713/193 |
| 2008/0082702 | A1* | 4/2008 | Ohtsu | G06K 15/02 |
| | | | | 710/33 |
| 2009/0064326 | A1* | 3/2009 | Goldstein | H04L 63/0227 |
| | | | | 726/22 |
| 2009/0260064 | A1* | 10/2009 | McDowell | G06F 21/10 |
| | | | | 726/4 |
| 2009/0271637 | A1* | 10/2009 | Takekawa | H04L 9/3247 |
| | | | | 713/189 |
| 2010/0043063 | A1* | 2/2010 | Ueda | G06F 21/31 |
| | | | | 706/47 |
| 2011/0087890 | A1* | 4/2011 | Munsil | H04L 9/0866 |
| | | | | 713/184 |
| 2011/0093920 | A1* | 4/2011 | Etchegoyen | H04L 63/0876 |
| | | | | 726/3 |
| 2011/0138465 | A1* | 6/2011 | Franklin | G06F 21/564 |
| | | | | 726/23 |
| 2013/0166920 | A1 | 6/2013 | Cousins et al. | |
| 2014/0075199 | A1* | 3/2014 | Hiwatari | H04L 9/3236 |
| | | | | 713/176 |
| 2014/0175179 | A1* | 6/2014 | Carter | G06Q 20/3224 |
| | | | | 235/494 |
| 2014/0325644 | A1* | 10/2014 | Oberg | G06F 21/57 |
| | | | | 726/22 |
| 2015/0026784 | A1 | 1/2015 | Kurkure | |
| 2015/0195273 | A1 | 7/2015 | Tsang et al. | |
| 2015/0319183 | A1* | 11/2015 | Liske | G06F 21/52 |
| | | | | 726/23 |
| 2016/0125416 | A1 | 5/2016 | Spencer et al. | |
| 2016/0127367 | A1 | 5/2016 | Jevans | |
| 2016/0253518 | A1* | 9/2016 | Matsuo | G06F 21/6218 |
| | | | | 726/30 |
| 2016/0269393 | A1* | 9/2016 | Corella | G06F 21/32 |
| 2017/0063831 | A1 | 3/2017 | Arnold et al. | |
| 2017/0161520 | A1* | 6/2017 | Lockhart, III | G06F 21/6263 |
| 2017/0200324 | A1* | 7/2017 | Chennakeshu | G07C 5/008 |
| 2017/0244555 | A1* | 8/2017 | Beiter | G06K 19/06028 |
| 2017/0289185 | A1* | 10/2017 | Mandyam | H04L 63/12 |
| 2017/0346797 | A1* | 11/2017 | Yedidi | H04L 63/14 |
| 2018/0019993 | A1* | 1/2018 | Kravitz | H04L 9/0836 |
| 2018/0137303 | A1* | 5/2018 | Farkash | G06F 21/6263 |
| 2018/0234416 | A1* | 8/2018 | Moerk | H04L 63/08 |
| 2018/0294977 | A1* | 10/2018 | Uhr | G06F 21/33 |
| 2018/0332079 | A1* | 11/2018 | Ashley | H04L 63/20 |
| 2018/0343283 | A1* | 11/2018 | Goutal | H04L 63/06 |
| 2019/0020653 | A1* | 1/2019 | Brown | G06Q 30/0267 |
| 2019/0043300 | A1* | 2/2019 | Weston | G06F 21/554 |
| 2019/0124109 | A1* | 4/2019 | Foster | H04L 67/306 |
| 2019/0260782 | A1* | 8/2019 | Humphrey | H04L 63/0209 |
| 2019/0268145 | A1 | 8/2019 | Barth | |
| 2019/0312882 | A1* | 10/2019 | D'Agostino | G06Q 20/405 |
| 2019/0340390 | A1* | 11/2019 | Richards | G06F 21/6227 |
| 2020/0082124 | A1 | 3/2020 | Pedersen | |
| 2020/0106756 | A1 | 4/2020 | Osborn et al. | |
| 2020/0106797 | A1* | 4/2020 | Christian | H04L 63/1483 |
| 2020/0137096 | A1* | 4/2020 | Endler | H04L 63/083 |
| 2020/0137105 | A1* | 4/2020 | Endler | G06F 21/6218 |
| 2020/0211002 | A1 | 7/2020 | Steinberg | |
| 2020/0285773 | A1* | 9/2020 | Malecki | G06F 21/602 |
| 2020/0314120 | A1* | 10/2020 | Dedenok | H04L 51/18 |
| 2020/0374129 | A1 | 11/2020 | Dilles et al. | |
| 2020/0412762 | A1* | 12/2020 | Mohamed | G06F 9/451 |
| 2021/0004786 | A1* | 1/2021 | Mossler | H04L 9/3073 |
| 2021/0006573 | A1* | 1/2021 | Britt | G06F 16/258 |
| 2021/0058827 | A1* | 2/2021 | Holmström | H04W 28/0263 |
| 2021/0091938 | A1* | 3/2021 | Lurey | H04L 9/3218 |
| 2021/0099484 | A1* | 4/2021 | Li | G06F 16/2255 |
| 2021/0250466 | A1* | 8/2021 | Amarendra | G06F 21/6209 |
| 2021/0306152 | A1 | 9/2021 | Ali et al. | |
| 2021/0377300 | A1* | 12/2021 | Devane | H04L 63/1416 |
| 2021/0400040 | A1 | 12/2021 | Shiga | |
| 2022/0070000 | A1* | 3/2022 | Gondza | H04L 63/123 |
| 2022/0277102 | A1* | 9/2022 | Kim | H04L 9/0643 |
| 2022/0321601 | A1* | 10/2022 | Kras | H04L 63/12 |
| 2022/0368682 | A1* | 11/2022 | Verzun | H04L 9/50 |
| 2022/0405765 | A1* | 12/2022 | Bekiyants | H04L 9/3239 |
| 2022/0414227 | A1* | 12/2022 | Belenky | G06F 21/556 |

* cited by examiner

US 11,843,620 B1

STATELESS SYSTEM TO ENABLE DATA BREACH

CROSS REFERENCE

This application is a continuation of U.S. Non-Provisional patent application Ser. No. 17/961,860, filed on Oct. 7, 2022, and titled "Stateless System To Enable Data Breach Notification," the entire contents of which are incorporated herein by reference.

FIELD OF DISCLOSURE

Aspects of the present disclosure generally relate to use of computer hardware and/or software to manage data, and in particular to providing a stateless system to enable data breach notification.

BACKGROUND

Various methods of cryptography (e.g., encrypting and decrypting data) are known. Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. Encoded/encrypted data may be decoded/decrypted with a given decryption key. In an example, symmetric cryptography may utilize encryption and decryption algorithms that rely on a single private key for encryption and decryption of data. Symmetric cryptography is considered to be relatively speedy. One example of an encryption and decryption algorithm utilized by symmetric encryption may be an AES encryption cipher. On the other hand, asymmetric cryptography may utilize encryption and decryption algorithms that rely on two separate but mathematically-related keys for encryption and decryption of data. For instance, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

SUMMARY

In one aspect, the present disclosure contemplates a method including determining, by the infrastructure device, a breach database including breach information indicating breached data that is compromised due to a data breach; calculating, by the infrastructure device, a hash of the breached data; calculating, by the user device, a hash of private data; transmitting, by the user device, the hash of the private data to the infrastructure device; comparing, by the infrastructure device, the hash of the private data with the hash of the breached data; and transmitting, by the infrastructure device to the user device based at least in part on a result of the comparison, a notification indicating whether the private data is breached due to the data breach.

In another aspect, the present disclosure contemplates a system comprising: an infrastructure device; and a user device in communication with the infrastructure device, wherein the infrastructure device is configured to determine a breach database including breach information indicating breached data that is compromised due to a data breach; the infrastructure device is configured to calculate a hash of the breached data; the user device is configured to calculate a hash of private data; the user device is configured to transmit the hash of the private data to the infrastructure device; the infrastructure device is configured to compare the hash of the private data with the hash of the breached data; and the infrastructure device is configured to transmit, to the user device based at least in part on a result of the comparison, a notification indicating whether the private data is breached due to the data breach.

In another aspect, the present disclosure contemplates a non-transitory computer readable medium storing instructions, which when executed by a user device and an infrastructure device, configure: the infrastructure device to determine a breach database including breach information indicating breached data that is compromised due to a data breach; the infrastructure device to calculate a hash of the breached data; the user device to calculate a hash of private data; the user device to transmit the hash of the private data to the infrastructure device; the infrastructure device to compare the hash of the private data with the hash of the breached data; and the infrastructure device to transmit, to the user device based at least in part on a result of the comparison, a notification indicating whether the private data is breached due to the data breach.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
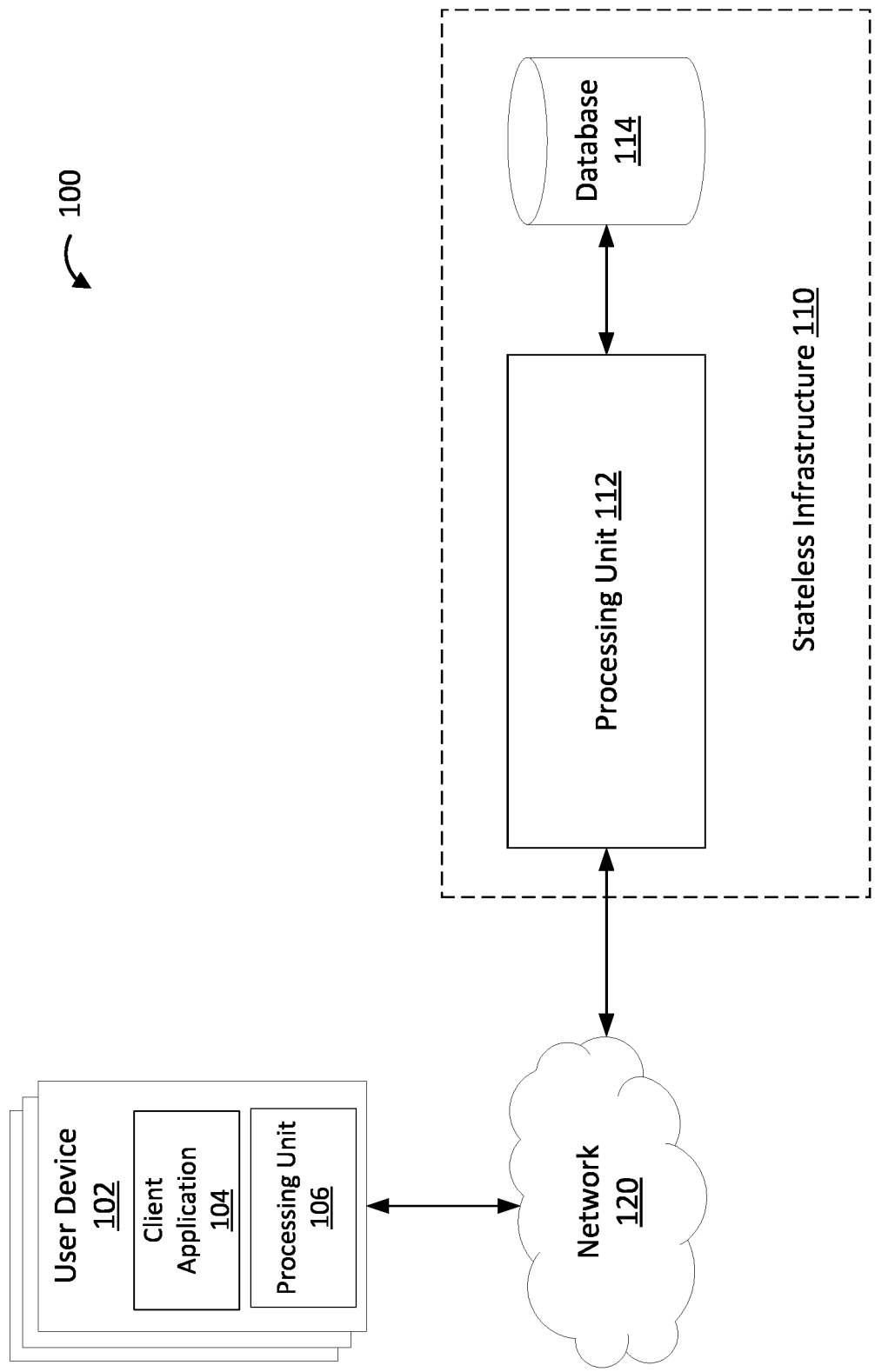

FIG. 1 is an illustration of an example system associated with a stateless system to enable data breach notification, according to various aspects of the present disclosure.

Figure 2:
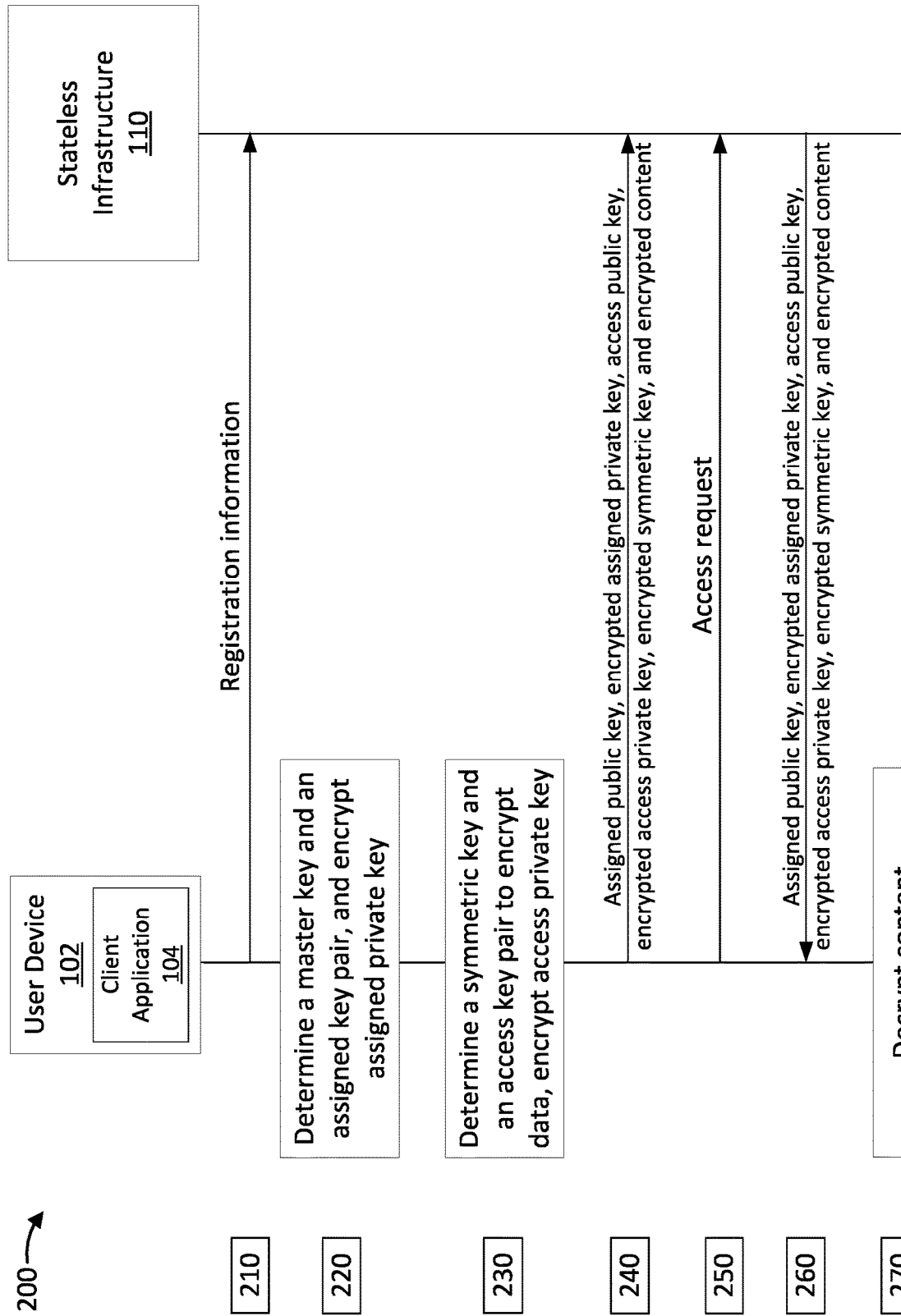

FIG. 2 is an illustration of an example flow associated with a stateless system to enable data breach notification, according to various aspects of the present disclosure.

Figure 3:
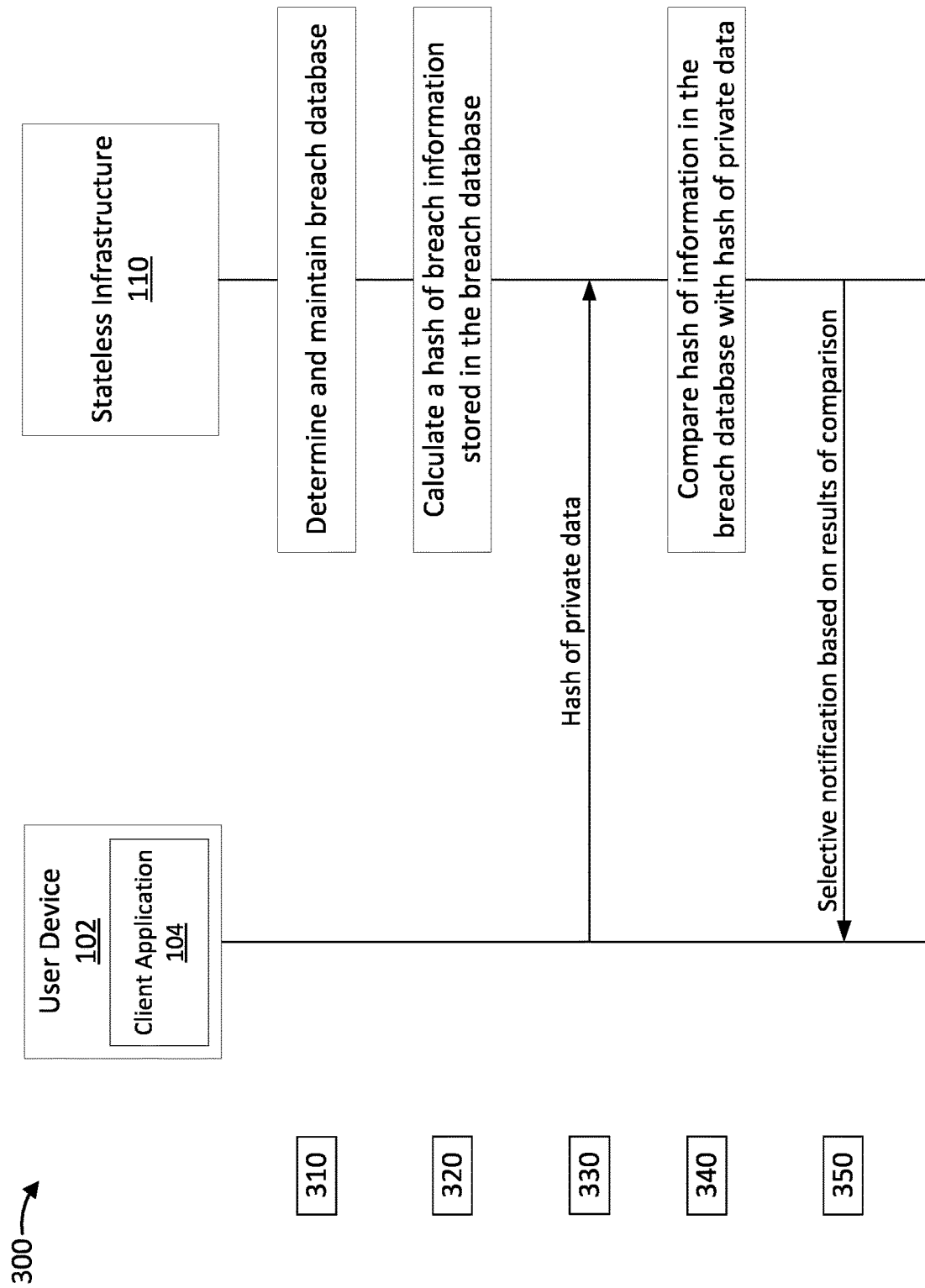

FIG. 3 is an illustration of an example flow associated with a stateless system to enable data breach notification, according to various aspects of the present disclosure.

Figure 4:
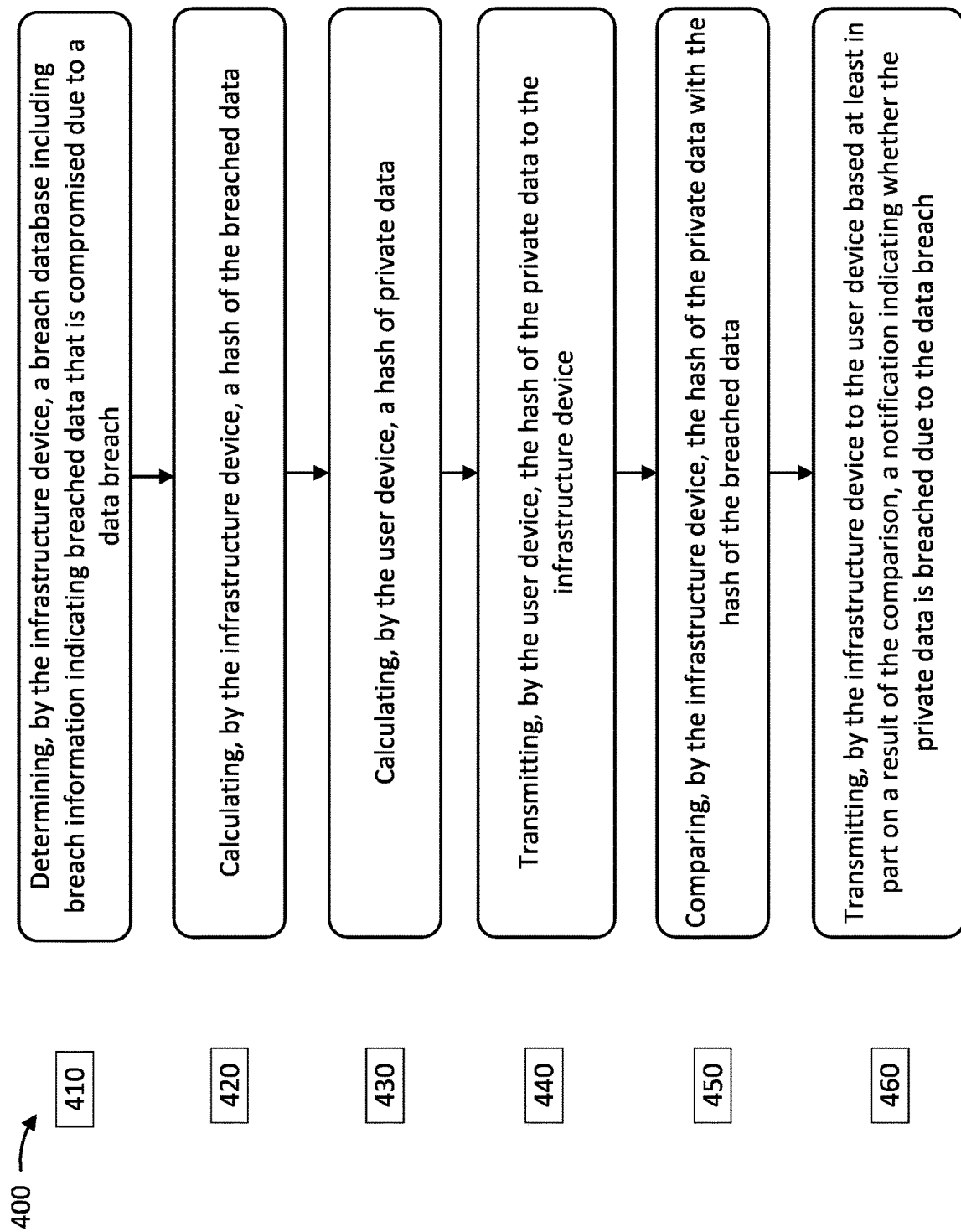

FIG. 4 is an illustration of an example process associated with a stateless system to enable data breach notification, according to various aspects of the present disclosure.

Figure 5:
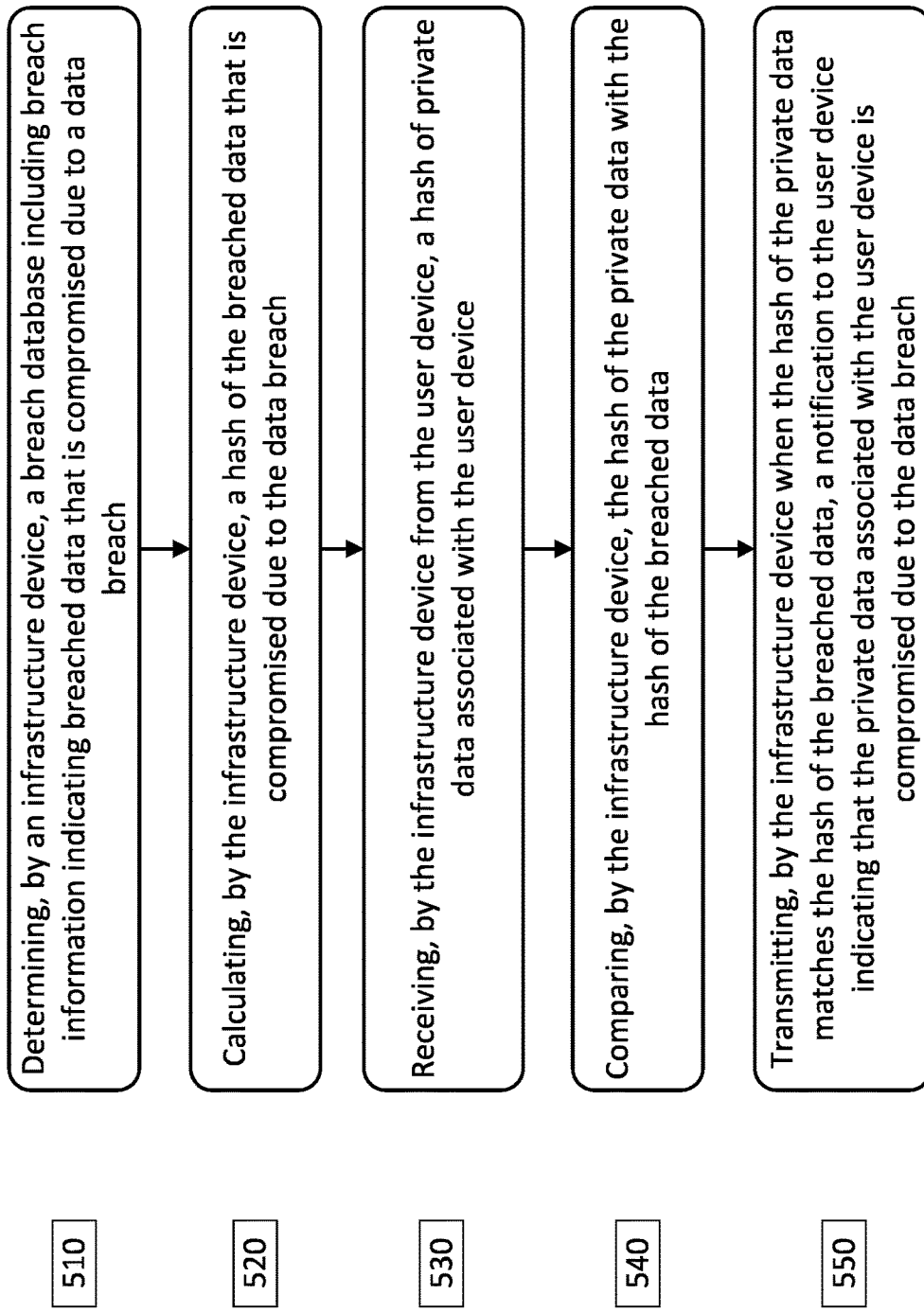

FIG. 5 is an illustration of an example process associated with a stateless system to enable data breach notification, according to various aspects of the present disclosure.

Figure 6:
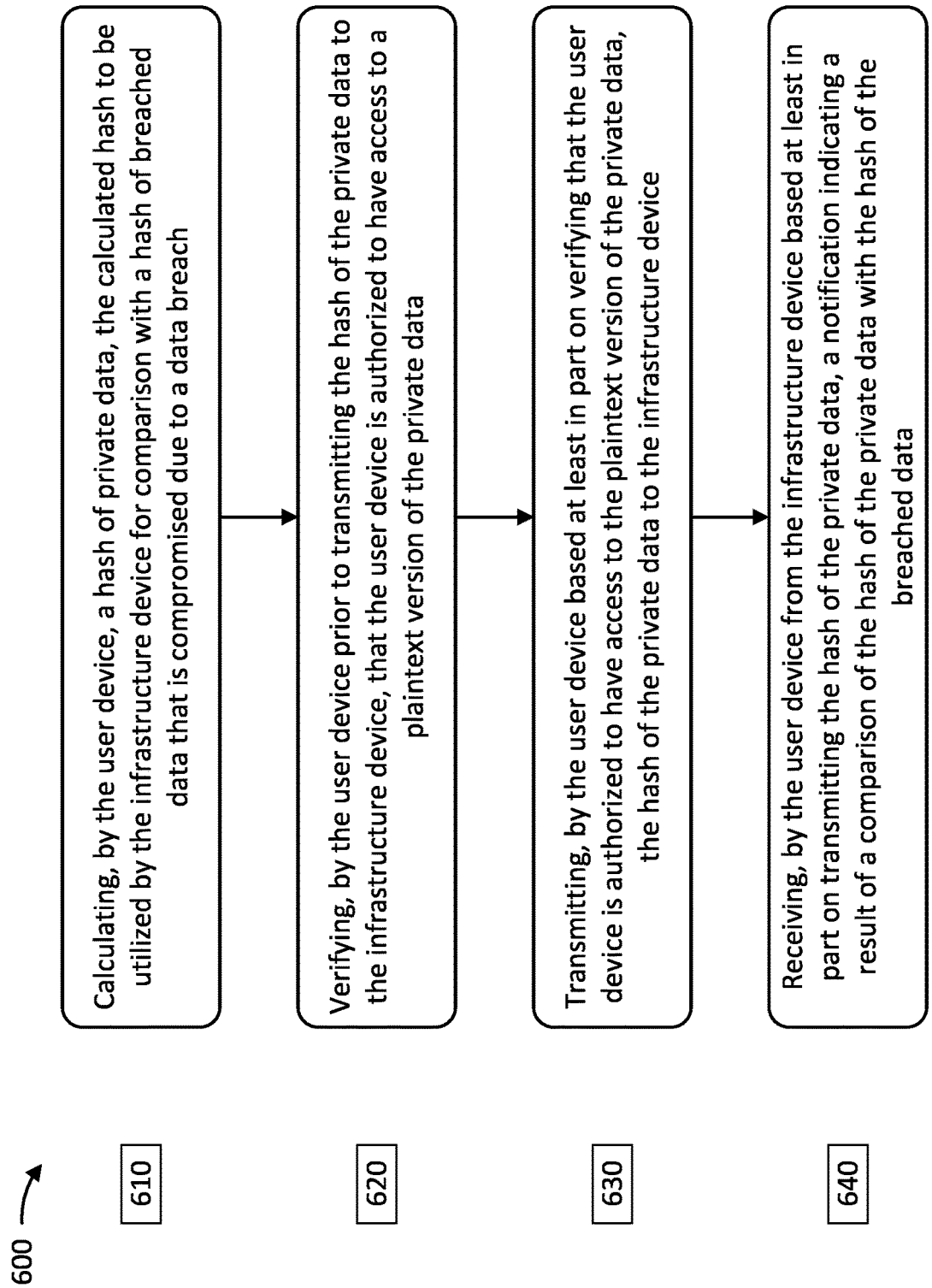

FIG. 6 is an illustration of an example process associated with a stateless system to enable data breach notification, according to various aspects of the present disclosure.

Figure 7:
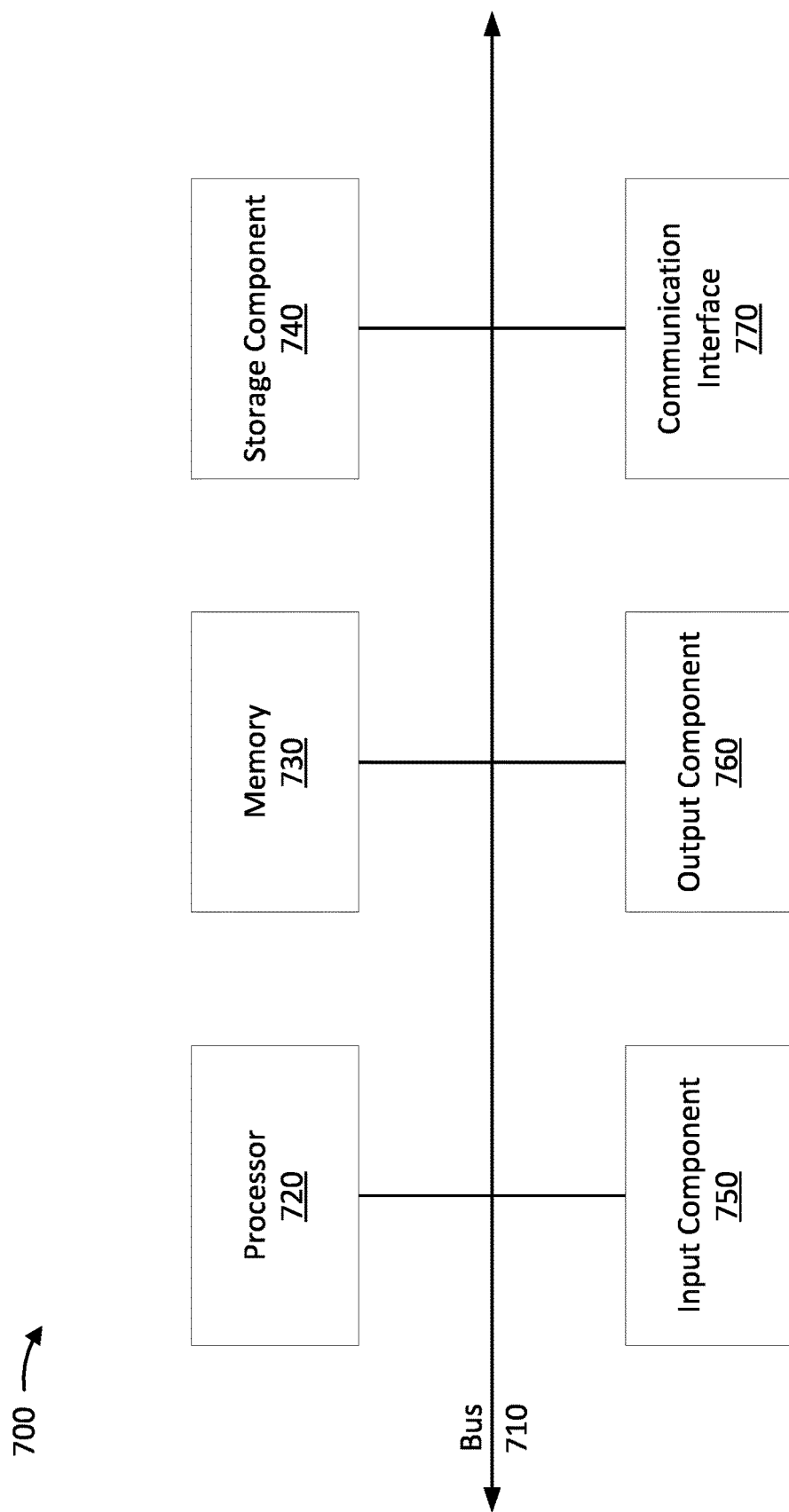

FIG. 7 is an illustration of example devices associated with a stateless system to enable data breach notification, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with a stateless system to enable data breach notification, according to various aspects of the present disclosure. The system 100 includes one or more user devices 102 communicating with a stateless infrastructure 110, including a processing unit 112 and a database (e.g., memory) 114. A user device 102 may include a processing unit 106 and may utilize an installed client application 104 to communicate with an application programming interface (API) (not shown) included in the stateless infrastructure 110. In some aspects, the user device 102 and the stateless infrastructure 110 may communicate with one another over a network 120.

The user device 102 may be a physical computing device capable of hosting a client application and of connecting to the network 120. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The user device 102 may include and/or may be associated with a communication interface to communicate (e.g., receive and/or transmit) data.

In some aspects, the stateless infrastructure 110 may configure and provide the user device 102 with a client application 104 to be installed on the user device 102. The client application 104 may enable a processor (e.g., processing unit 106, processor 720) associated with the user device 102 to encrypt and decrypt data. In some aspects, the client application 104 and/or the stateless infrastructure 110 may utilize one or more encryption and decryption algorithms to encrypt and decrypt the data. The encryption algorithms and decryption algorithms may employ standards such as, for example, data encryption standards (DES), advanced encryption standards (AES), Rivest—Shamir—Adleman (RSA) encryption standard, Open PGP standards, file encryption overview, disk encryption overview, email encryption overview, etc. Some examples of encryption algorithms include a triple data encryption standard (DES) algorithm, Rivest—Shamir— Adleman (RSA) encryption algorithm, advanced encryption standards (AES) algorithms, Twofish encryption algorithms, Blowfish encryption algorithms, IDEA encryption algorithms, MD5 encryption algorithms, HMAC encryption algorithms, etc.

In some aspects, data may include any information such as private information including, for example, bank account numbers, credit card numbers, various passwords, etc. In some aspects, the data may include electronic information included in files such as, for example, photographs, documents, compact discs (CDs), digital video disks (DVDs), etc. including written, printed, and/or electronic matter that provides information and/or evidence.

The stateless infrastructure 110 may include the processing unit 112 and the database 114. The processing unit 112 may include a logical component configured to perform complex operations to evaluate various factors associated with encrypting and decrypting the data. The database 114 may store various pieces of information associated with encrypting and decrypting the data, including encrypted content and/or encrypted key information. In some aspects, the stateless infrastructure 110 may include an application programming interface (API) (not shown) to communicate with the client application 104. The stateless infrastructure 110 may include or be associated with a communication interface to communicate (e.g., transmit and/or receive) data.

The network 120 may be a wired or wireless network. In some aspects, the network 120 may include one or more of, for example, a phone line, a local-area network (LAN), a wide-area network (WAN), a metropolitan-area network (MAN), a home-area network (HAN), Internet, Intranet, Extranet, and Internetwork. In some aspects, the network 120 may include a digital telecommunication network that permits several nodes to share and access resources.

One or more components (e.g., processing units, database, client applications, etc.) included in example 100 shown in FIG. 1 may further be associated with a controller/processor, a memory, a communication interface, or a combination thereof (e.g., FIG. 7). For instance, the one or more components may include or may be included in a controller/processor, a memory, or a combination thereof. In some aspects, the one or more components may be separate and distinct from each other. Alternatively, in some aspects, the one or more components may be combined with another one of the one or more components. In some aspects, the one or more components may be local with respect to another one of the one or more components. Alternatively, in some aspects, the one or more components may be located remotely with respect to another one of the one or more components. Additionally, or alternatively, the one or more components may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another one of the one or more components.

As indicated above, FIG. 1 is provided as an example. Other examples may differ from what is described with regard to FIG. 1.

A user device may request data storage services from a data storage service provider (DSSP). Such data storage services may include cloud storage services that enable the user device to utilize, for example, the Internet to store data on remote servers and/or storage devices managed by the DSSP. The data storage services may also be referred to as cloud backup services, online data storage services, online drive storages, file hosting services, file storage services, or the like. The DSSP may attempt to protect the stored data by requiring the user device to provide credentials (e.g., username, password, or the like) to gain authorized access to the stored data. The data storage services may be available via use of a web interface and/or an application interface.

In some instances, the stored data may become unprotected due to a data breach. In an example, a third party may gain unauthorized access to the stored data by, for example, hacking into a remote server and/or storage device managed by the DSSP. In another example, an internal device associated with the DSSP (e.g., a DSSP employee device) with access to the remote servers and/or storage devices managed by the DSSP may gain unauthorized access to the stored data. Such data breaches may result in an integrity of the stored data becoming compromised. To regain access to the stored data and/or to protect the stored data after a data breach, the user device and/or the DSSP may expend resources (e.g., management resources, memory resources, computational/processing resources, power consumption resources, system bandwidth, network resources, etc.) that may otherwise be used for more suitable tasks associated with the data storage services.

Additionally, the user device may be unaware of the data breach (e.g., unauthorized access). In this case, until the user device becomes aware of the data breach, the unauthorized access may freely continue, thereby leading to access to private data associated with the user device. In an example, based at least in part on examining the stored data, the malicious party may freely determine the private data (e.g., identification information of a user of the user device, contact information of the user, financial information of the user, etc.). In another example, based at least in part on examining the stored data, the malicious party may gain access to information to enable the malicious party to freely observe activity of the user device over a network, thereby enabling the malicious party to access the private data. A delay in implementing restorative measures after occurrence of the data breach may compromise the private data, and the user device and the DSSP may inefficiently expend user device resources and/or DSSP resources (e.g., management resources, memory resources, computational/processing resources, power consumption resources, system bandwidth, network resources, etc.) to mitigate the effects of the delay in implementing the restorative measures.

Various aspects of systems and techniques discussed in the present disclosure provide a stateless system to enable data breach notification. In some aspects, a DSSP may provide a stateless system including a stateless infrastructure and/or a client application installed on a user device. In some aspects, the stateless infrastructure may configure and provide the user device with the client application. In some aspects, the client application may enable the user device to encrypt and decrypt private data that the user device may wish to protect. In an example, the client application may enable the user device to encrypt the private data, to store the encrypted data, and to decrypt the encrypted private data. In some aspects, the user device may encrypt the private data, store the encrypted private data, and decrypt the encrypted private data without the stateless infrastructure having access to and/or storing unencrypted private data. As a result, even if a malicious party gains unauthorized access to the stateless infrastructure, the unauthorized access may lead to encrypted private data, which the malicious party may not be able to decrypt and/or examine. The client application and/or the stateless infrastructure may employ a particular arrangement of keys to encrypt and decrypt the private data. Such particular arrangement of keys may be critical because it enables the client application and/or the stateless infrastructure to provide data storage services (e.g., protect stored data) without storing unencrypted private data. In some aspects, the client application may utilize derivation algorithms and/or key derivation functions to determine various cryptographic keys. In this way, the client application and/or the stateless infrastructure may mitigate instances of the private data becoming compromised, thereby enabling efficient utilization of resources (e.g., management resources, memory resources, computational/processing resources, power consumption resources, system bandwidth, network resources, etc.) associated with the user device and/or the stateless infrastructure for more suitable tasks related to the data storage services.

Additionally, the stateless system may notify the user device of a data breach in real time. In some aspects, through a data breach, a malicious party may gain unauthorized access to the private data and/or the private data may become compromised. The stateless infrastructure may determine a breach database indicating breach information associated with data breaches. Also, the stateless infrastructure may maintain the breach database by continuously monitoring for and updating the breach database with new breach information. The stateless infrastructure may calculate a hash associated with the breach information. Further, the stateless infrastructure may configure the client application to periodically transmit to the stateless infrastructure a hash of the private data. The stateless infrastructure may compare the calculated hash with the received hash to determine whether a data breach has occurred. When the calculated hash fails to match (e.g., is different from) the received hash, the stateless infrastructure may determine that the breach database fails to include information associated with the private data. In this case, the stateless infrastructure may determine that a data breach with respect to the private data has not occurred. When the calculated hash matches (e.g., is the same as) the received hash, the stateless infrastructure may determine that the breach database includes information associated with the private data. In this case, the stateless infrastructure may determine that the data breach with respect to the private data has occurred. As a result, the stateless infrastructure may select to transmit, in real time, a notification to the user device indicating the occurrence of the data breach with respect to the private data. In this way, the user device may implement, without delay, restorative measures to mitigate effects of the data breach, thereby enabling efficient utilization of user device resources and/or DSSP resources (e.g., management resources, memory resources, computational/processing resources, power consumption resources, system bandwidth, network resources, etc.) for more suitable tasks associated with the data storage services.

In some aspects, the infrastructure device is configured to determine a breach database including breach information indicating breached data that is compromised due to a data breach; the infrastructure device is configured to calculate a hash of the breached data; the user device is configured to calculate a hash of private data; the user device is configured to transmit the hash of the private data to the infrastructure device; the infrastructure device is configured to compare the hash of the private data with the hash of the breached data; and the infrastructure device is configured to transmit, to the user device based at least in part on a result of the comparison, a notification indicating whether the private data is breached due to the data breach.

FIG. 2 is an illustration of an example flow 200 associated with a stateless system to enable data breach notification, according to various aspects of the present disclosure. The example flow 200 may include a user device 102, from among one or more user devices, in communication with a stateless infrastructure 110. In some aspects, the user device 102 may install a client application 104 configured and provided by the stateless infrastructure 110 and may use the client application 104 to communicate with the stateless infrastructure 110. In some aspects, the user device 102 and the stateless infrastructure may communicate over a network (e.g., network 120).

As shown by reference numeral 210, the user device 102 may register an account with the stateless infrastructure 110. In some aspects, during the registration, the user device 102 may provide registration information such as, for example, identity of an owner of the user device 102, a phone number associated with the user device 102, an email address associated with the user device 102, etc. In some aspects, the user device 102 may set up an access system including, for example, username, password, or the like to subsequently gain access to the registered account. In some aspects, registration information may include acknowledgment and/or agreement by the user device 102 to operating policies (e.g., privacy policy, etc.) associated with the stateless infrastructure 110.

The stateless infrastructure 110 may configure and provide the client application 104 to be installed on the user device 102. The client application 104 may enable the user device 102 to receive information to be processed by the client application 104 and/or by the stateless infrastructure 110. The client application 104 may include a graphical interface to receive the information via a local input interface (e.g., touch screen, keyboard, mouse, pointer, etc.) associated with the user device 102. The information may be received via text input or via a selection from among a plurality of options (e.g., pull down menu, etc.). In some aspects, the client application 104 may activate and/or enable, at a time associated with the registration (e.g., after the registration) and/or logging in for access, the graphical interface for receiving the information. For instance, the client application 104 may cause a screen (e.g., local screen) associated with the user device 102 to display, for example, a pop-up message to request entry of the information. Further, the client application 104 may enable transmission of at least a portion of the information to the stateless infrastructure 110.

As shown by reference numeral 220, the client application 104 may determine information based at least in part on the registration of the account with the stateless infrastructure 110. In an example, the client application 104 may determine an asymmetric assigned key pair for the registered account associated with user device 102. In some aspects, the assigned key pair may be unique to the registered account and may include an assigned public key and an assigned private key. In this way, the assigned public key and the assigned private key may be user device-specific and/or account-specific. The assigned public key and the assigned private key may be associated with each other via, for example, a mathematical function. As a result, data encrypted using the assigned public key may be decrypted by utilizing the assigned private key.

Further, the client application 104 may set up credentials in the form of a master string of alphanumeric characters from the user device 102. The user device 102 may utilize the master string to gain access to the registered account and/or to stored data. In some aspects, the master string may be unique and be associated with the registered account. Based at least in part on receiving the master string, the client application 104 may determine a master key. In some aspects, the client application 104 may utilize a password derivation function and/or a key derivation function to determine the master key based at least in part on the master string. The password derivation function and/or the key derivation function may perform password hashing to determine the master key. The client application 104 may utilize the master key to encrypt the assigned private key associated with the registered account.

As shown by reference numeral 230, when the user device 102 is to encrypt and store private data, the client application 104 may determine a symmetric key and an access key pair. In some aspects, the client application 104 may determine respective symmetric keys and respective access key pairs for each piece of private data (e.g., content) that the user device 102 may wish to encrypt. In this way, the symmetric key and the access key pair may be content-specific. Examples of content may include any information including, for example, alphanumeric data such as passwords, credit card numbers, bank account numbers, etc. and/or information that is written, printed, and/or electronically included in documents and/or files such as photographs, processing documents, CDs, DVDs, etc.

For given content, the client application 104 may utilize a random bit generator to determine the symmetric key. In this case, the symmetric key may be a random key including a sequence of unpredictable and unbiased information. Further, the client application 104 may determine an access key pair including an access public key and an access private key. The access public key and the access private key may be associated with each other via, for example, a mathematical function. As a result, data encrypted using the access public key may be decrypted by utilizing the access private key.

The client application 104 may utilize the symmetric key, the access public key, and the assigned public key to encrypt the content. In an example, the client application 104 may encrypt the content using the symmetric key. The client application 104 may encrypt the symmetric key using the access public key. The client application 104 may encrypt the access private key using the assigned public key associated with the registered account.

In some aspects, the client application 104 may enable the user device 102 to store the encrypted content. For instance, the user device 102 may store the encrypted content locally and/or remotely. In an example, the user device 102 may store the encrypted content in a local memory and/or a remote memory associated with the user device 102. In another example, the user device 102 may store the encrypted content in a data storage associated with data storage services provided by the stateless infrastructure 110. In yet another example, the user device 102 may store the encrypted content in a hand-held memory (e.g., a USB thumb drive, flash drive, etc.).

As shown by reference numeral 240, the client application 104 may transmit, and the stateless infrastructure 110 may receive, at least a portion of the information determined by the client application 104. For instance, the client application 104 may transmit one or more of the assigned public keys, the encrypted assigned private key, access public key, the encrypted access private key, the encrypted symmetric key, and/or the encrypted content to the stateless infrastructure 110. The stateless infrastructure 110 may store the received information in association with the registered account associated with the user device 102.

When the user device 102 (or the other device associated with the registered account) may wish to access and/or decrypt the encrypted content, as shown by reference numeral 250, the user device 102 (e.g., or the other device) may transmit an access request to access the registered account. Based at least in part on receiving the access request, as shown by reference numeral 260, the stateless infrastructure 110 may transmit, and the client application 104 may receive, the encrypted assigned private key. In some aspects, as also shown by reference numeral 260, when the user device 102 and/or the other device may not have access to the encrypted content, the stateless infrastructure 110 may also transmit the assigned public key, the access public key, encrypted access private key, the encrypted symmetric key, and the encrypted content to the user device 102 and/or the other device.

Based at least in part on receiving the assigned public key, the access public key, the encrypted assigned private key, the encrypted access private key, the encrypted symmetric key, and the encrypted content, the client application 104 may be enabled to decrypt the content. For instance, the client application 104 may request credentials in the form of the master string. Based at least in part on receiving the master string, the client application 104 may determine the master key that was utilized to encrypt the assigned private key. The client application 104 may utilize the master key to decrypt the assigned private key. The client application 104 may utilize the assigned private key to decrypt the encrypted access private key based at least in part on an association between the assigned private key and the assigned public key. Further, the client application 104 may utilize the access private key to decrypt the symmetric key based at least in part on an association between the access private key and the access public key. As shown by reference numeral 270, the client application 104 may utilize the symmetric key to decrypt the content.

In some aspects, one or more functionalities performed by the client application 104 may be included in and/or may be performed by the stateless infrastructure 110, and vice versa.

By utilizing the above critical arrangement, the stateless infrastructure 110 may provide data storage services (e.g., protect data) without having access to and/or storing unencrypted content and/or unencrypted keys. For instance, the stateless infrastructure 110 may not have access to and/or may not store information such as the master string, the master key, access key pair, content, etc. in unencrypted form. In this way, the client application and/or the stateless infrastructure 110 may mitigate instances of the private data becoming compromised, thereby enabling efficient utilization of resources (e.g., management resources, memory resources, computational/processing resources, power consumption resources, system bandwidth, network resources, etc.) associated with the user device and/or the stateless infrastructure for more suitable tasks related to the data storage services.

As indicated above, FIG. 2 is provided as an example. Other examples may differ from what is described with regard to FIG. 2.

FIG. 3 is an illustration of an example flow 300 associated with a stateless system to enable data breach notification, according to various aspects of the present disclosure. The example flow 300 may include one or more user devices 102 (e.g., first user device, second user device, etc.) in communication with a stateless infrastructure 110. In some aspects, the one or more user devices 102 may be associated with respective registered accounts with the stateless infrastructure 110. Further, the one or more user devices 102 may install respective client applications 104 configured and provided by the stateless infrastructure 110. The one or more user devices 102 may utilize the respective client applications 104 to communicate with an application programming interface (API) and a processor (e.g., processing unit 112, processor 720) associated with the stateless infrastructure 110. In some aspects, the one or more user devices 102 and the stateless infrastructure may communicate over a network (e.g., network 120).

As shown by reference numeral 310, the stateless infrastructure 110 may determine and maintain a breach database. The breach database may include breach information indicating pieces of breached data (e.g., email addresses, contact information, phone numbers, bank account information, credit card information, personal health information, passwords, etc., or a combination thereof) that is believed and/or known to have been compromised through a data breach. In some aspects, a data breach may include an incident that intentionally or accidentally exposes and/or compromises the breached data. The stateless infrastructure 110 may store the breach information in an associated memory (e.g., database 114). In some aspects, the stateless infrastructure 110 may compile the breach information based at least in part on scanning publicly available sources (e.g., public announcements, news, etc.). In some aspects, the stateless infrastructure 110 may compile the breach information based at least in part on purchasing the breach information from vendors thereof. In some aspects, the stateless infrastructure 110 may compile the breach information based at least in part on receiving reports (e.g., survey data, complaints, feedback, or the like) from various sources including, for example, user devices associated with the stateless infrastructure 110.

Further, the stateless infrastructure 110 may maintain the breach database. In some aspects, the stateless infrastructure 110 may continuously monitor availability of new breach information and may update, in real time, the breach database based at least in part on determining availability of the new breach information. In some aspects, the stateless infrastructure 110 may monitor availability of the new breach information and may update, at time selected by the user, the breach database based at least in part on determining availability of the new breach information. In some aspects, the updating of the breach database may be carried out without interruption of any activity on the user device 102.

As shown by reference numeral 320, the stateless infrastructure 110 may calculate one or more hashes of the pieces of the breached data indicated by the breach information. In some aspects, the stateless infrastructure 110 may utilize a first algorithm including a hash function to calculate the one or more hashes of the pieces of breached data indicated by the breach information. In an example, the stateless infrastructure 110 may apply the hash function to the pieces of breached data indicated by the breach information to calculate the one or more hashes.

As shown by reference numeral 330, the stateless infrastructure may receive one or more hashes associated with pieces of private data from a user device 102, from among the one or more user devices. In some aspects, the user device 102 may transmit the one or more hashes to determine whether the private data was compromised through a data breach. In some aspects, the user device 102 may utilize the client application 104 to determine the one or more hashes. Because the client application 104 may have access to plaintext (e.g., unencrypted and/or un-hashed) private data, the client application 104 may determine the one or more hashes associated with the pieces of private data.

In some aspects, the stateless infrastructure 110 may configure the client application 104 to utilize the same first algorithm including the hash function to determine the one or more hashes associated with the pieces of private data. Further, to account for modifications in the private data, the stateless infrastructure 110 may configure the client application 104 to periodically (e.g., every 30 minutes, 60 minutes, 120 minutes, 300 minutes, etc.) determine and transmit the one or more hashes to the stateless infrastructure 110. In some aspects, the stateless infrastructure 110 may store the one or more hashes received from the client application 104 and may periodically (e.g., every 30 minutes, 60 minutes, 120 minutes, 300 minutes, etc.) determine, as discussed below, whether the private data was compromised through a data breach.

In some aspects, prior to transmitting the one or more hashes, the stateless infrastructure 110 and/or the user device 102 may verify that the client application 104 is authorized to possess and/or access the plaintext private data and/or to transmit the one or more hashes associated with the private data to the stateless infrastructure 110 for determination of whether the private data was compromised through a data breach.

For instance, the client application 104 may transmit a message to the stateless infrastructure 110 indicating that the client application 104 is to transmit the one or more hashes associated with the private data. Based at least in part on receiving the message, the stateless infrastructure 110 may utilize registration information received during registration of an account associated with the user device 102 (e.g., block 210), to transmit a one-time token (e.g., alphanumeric code). The registration information may include, for example, an email address associated with the user device 102, a phone number associated with the user device 102, etc. Based at least in part on being associated with the account, the client application 104 may receive the one-time token transmitted by the stateless infrastructure 110. Further, prior to transmitting the one or more hashes, the client application 104 may transmit the one-time token to the stateless infrastructure 110.

When the stateless infrastructure 110 determines that the one-time token received from the client application 104 matches (e.g., is the same as) the one-time token transmitted by the stateless infrastructure 110 based at least in part on utilizing the registration information, the stateless infrastructure may determine that the client application 104 is authorized to possess and/or access the plaintext private data. In this case, the stateless infrastructure 110 may transmit a response to the client application 104 indicating that the client application 104 is to transmit the one or more hashes. Alternatively, when the stateless infrastructure 110 fails to receive the one-time token from the client application 104 within a predetermined amount of time or determines that the one-time token received from the client application 104 fails to match (e.g., is different from) the one-time token transmitted by the stateless infrastructure 110 based at least in part on utilizing the registration information, the stateless infrastructure 110 may determine that the client application is not authorized to possess and/or access the plaintext private data. In this case, the stateless infrastructure 110 may transmit the response to the client application 104 indicating that the client 104 is to refrain from transmitting the one or more hashes.

In some aspects, the registered account may be associated with an entity related to a plurality of user devices. In an example, the registered account may be associated with a given domain (e.g., my company.com) related to a first user device (e.g., the user device 102) and a second user device (e.g., another user device 102). The first user device may be authorized to determine whether first private data associated with the first user device and/or second private data associated with the second user device has been compromised through a data breach. In one example, the first user device may have access to plaintext first private data and/or the plaintext second private data. In another example, the first user device may not have access to the plaintext second private data but may be able to determine whether second private data associated with the second user device has been compromised through the data breach. In these cases, during registration of the account, the stateless infrastructure 110 may provide the first user device with an entity token assigned to the entity.

When the first user device is to determine whether the second private data has been compromised, the client application 104 may transmit a message to the stateless infrastructure 110 indicating that the client application 104 is to transmit the one or more hashes associated with the second private data. Based at least in part on receiving the message, the stateless infrastructure 110 may transmit a response to the client application 104 indicating that the client application 104 is to transmit the entity token to verify that the first user device is authorized to have access to plaintext second private data and/or to determine whether the second private data has been compromised through the data breach. Based at least in part on receiving the response, the client application 104 may transmit the entity token to the stateless infrastructure 110.

When the stateless infrastructure 110 determines that the entity token received from the client application 104 matches (e.g., is the same as) the entity token assigned to the entity, the stateless infrastructure may determine that the client application 104 is authorized to possess and/or access the plaintext second private data and/or to determine the second private data associated with the second user device has been compromised through the data breach. In this case, the stateless infrastructure 110 may transmit a response to the client application 104 indicating that the client application 104 is to transmit the one or more hashes associated with the second private data. Alternatively, when the stateless infrastructure 110 fails to receive the entity token from the client application 104 within a predetermined amount of time or determines that the entity token received from the client application 104 fails to match (e.g., is different from) the entity token assigned to the entity, the stateless infrastructure 110 may determine that the client application is not authorized to possess and/or access the plaintext beckoned private data. In this case, the stateless infrastructure 110 may transmit the response to the client application 104 indicating that the client 104 is to refrain from transmitting the one or more hashes associated with the second private data.

As shown by reference numeral 340, the stateless infrastructure 110 may compare the one or more hashes calculated based at least in part on the breached data (e.g., calculated hash) with the one or more hashes associated with the private data received from the user device 102 (e.g., received hash). In some aspects, the stateless infrastructure 110 may conduct the comparison based at least in part on receiving the received hash. In some aspects, the stateless infrastructure 110 may request the user device 110 to provide the received hash based at least in part on updating the breach database with new breach information, and conducting the comparison based at least in part on receiving such received hash.

As shown by reference numeral 350, the stateless infrastructure 110 may selectively transmit a notification to the user device 102 based at least in part on results of the comparison. When the stateless infrastructure 110 determines that the received hash fails to match (e.g., is different from) the calculated hash, the stateless infrastructure 110 may determine that the breach database fails to include information associated with the private data. In this case, the stateless infrastructure may determine that a data breach with respect to the private data has not occurred. As a result, the stateless infrastructure 110 may select to transmit a notification indicating that the private data has not been compromised through the data breach. In some aspects, the stateless infrastructure 110 may select to refrain from transmitting any notification, thereby indicating that the private data has not been compromised through the data breach.

Alternatively, when the received hash matches (e.g., is the same as) the calculated hash, the stateless infrastructure may determine that the breach database includes information associated with the private data. In this case, the stateless infrastructure may determine that the data breach with respect to the private data has occurred. As a result, the stateless infrastructure 110 may select to transmit, in real time, a notification indicating that the private data has been compromised through the data breach.

In some aspects, when the stateless infrastructure 110 determines that the data breach with respect to the private data has occurred, the stateless infrastructure 110 may transmit, in association with the notification, information indicating a level of the data breach. In an example, the stateless infrastructure 110 may transmit information indicating a high level of data breach when one or more of the private data such as, for example, a password, bank account information, credit card information, etc. is compromised through the data breach. In another example, the stateless infrastructure 110 may transmit information indicating a medium level of data breach when one or more of the private data such as, for example, a phone number, email address, etc. is compromised through the data breach. In yet another example, the stateless infrastructure 110 transmit information indicating a low level of data breach when one or more of the private data such as, for example, a mailing address, evidence of existence of a social media account, etc. is compromised through the data breach.

In this way, the stateless system may transmit, in real time, a notification to the user device indicating the occurrence of the data breach with respect to the private data. As a result, the user device may implement, without delay, restorative measures to mitigate effects of the data breach. Such restorative measures may include, for example, changing passwords, email addresses, financial account information, etc. In some aspects, the client application 104 may be configured to change private data automatically based at least in part on utilizing randomly encrypted strings, based at least in part on receiving input from a user interface, and/or based at least in part on recommendations from the stateless infrastructure. As a result, the stateless system may enable efficient utilization of user device resources and/or DSSP resources (e.g., management resources, memory resources, computational/processing resources, power consumption resources, system bandwidth, network resources, etc.) for more suitable tasks associated with the data storage services.

FIG. 4 is an illustration of an example process 400 associated with a stateless system to enable data breach notification, according to various aspects of the present disclosure. In some aspects, the process 400 may be performed by respective memories and/or respective processors/controllers (e.g., processor 106, processor 720) associated with one or more user devices (e.g., user device 102) executing respective client applications and/or by a memory and/or a processor/controller (e.g., processing unit 112, processor 720) associated with a stateless infrastructure (e.g., stateless infrastructure 110). As shown by reference numeral 410, process 400 may include determining, by the infrastructure device, a breach database including breach information indicating breached data that is compromised due to a data breach. For instance, the infrastructure device may utilize the associated processor/controller to determine a breach database including breach information indicating breached data that is compromised due to a data breach, as discussed elsewhere herein.

As shown by reference numeral 420, process 400 may include calculating, by the infrastructure device, a hash of the breached data. For instance, the infrastructure device may utilize the associated processor/controller to calculate a hash of the breached data, as discussed elsewhere herein.

As shown by reference numeral 430, process 400 may include calculating, by the user device, a hash of private data. For instance, the user device may utilize the associated processor/controller to calculate a hash of private data, as discussed elsewhere herein.

As shown by reference numeral 440, process 400 may include transmitting, by the user device, the hash of the private data to the infrastructure device. For instance, the user device may utilize an associated communication interface (e.g., communication interface 770) with the associated processor/controller to transmit the hash of the private data to the infrastructure device, as discussed elsewhere herein.

As shown by reference numeral 450, process 400 may include comparing, by the infrastructure device, the hash of the private data with the hash of the breached data. For instance, the infrastructure device may utilize the associated processor/controller to compare the hash of the private data with the hash of the breached data, as discussed elsewhere herein.

As shown by reference numeral 460, process 400 may include transmitting, by the infrastructure device to the user device based at least in part on a result of the comparison, a notification indicating whether the private data is breached due to the data breach. For instance, the infrastructure device may utilize an associated communication interface (e.g., communication interface 770) with the associated processor/controller to transmit, to the user device based at least in part on a result of the comparison, a notification indicating whether the private data is breached due to the data breach, as discussed elsewhere herein.

Process 400 may include additional aspects, such as any single aspect or any combination of aspects described below and/or in connection with one or more other processes described elsewhere herein.

In a first aspect, process 400 may include verifying, by the infrastructure device prior to the user device transmitting the hash of the private data, that the user device is authorized to have access to a plaintext version of the private data.

In a second aspect, alone or in combination with the first aspect, process 400 may include communicating, by the infrastructure device and the user device prior to the user device transmitting the hash of the private data, a one-time token to verify that the user device is authorized to have access to the plaintext version of the private data.

In a third aspect, alone or in combination with the first through second aspects, in process 400, the user device calculating the hash of the private data includes the user device utilizing a hashing algorithm that is utilized by the infrastructure device to calculate the hash of the breached data.

In a fourth aspect, alone or in combination with the first through third aspects, in process 400, the private data is associated with another user device, the user device and the other user device being associated with a single account registered with the infrastructure device.

In a fifth aspect, alone or in combination with the first through fourth aspects, process 400 may include maintaining, by the infrastructure device, the breach database based at least in part on updating the breach database to include new breach information.

In a sixth aspect, alone or in combination with the first through fifth aspects, process 400 may include transmitting the hash of the private data includes the user device transmitting the hash of the private data periodically.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with a stateless system to enable data breach notification, according to various aspects of the present disclosure. In some aspects, the process 500 may be performed by a memory and/or a processor/controller (e.g., processing unit 112, processor 720) associated with a stateless infrastructure (e.g., stateless infrastructure 110). As shown by reference numeral 510, process 500 may include determining, by an infrastructure device, a breach database including breach information indicating breached data that is compromised due to a data breach. For instance, the stateless infrastructure may utilize the associated processor/controller to determine a breach database including breach information indicating breached data that is compromised due to a data breach, as discussed elsewhere herein.

As shown by reference numeral 520, process 500 may include calculating, by the infrastructure device, a hash of the breached data that is compromised due to the data breach. For instance, the stateless infrastructure may utilize the associated processor/controller to calculate a hash of the breached data that is compromised due to the data breach, as discussed elsewhere herein.

As shown by reference numeral 530, process 500 may include receiving, by the infrastructure device from the user device, a hash of private data associated with the user device. For instance, the stateless infrastructure may utilize an associated communication interface (e.g., communication interface 770) with the associated processor/controller to receive, from the user device, a hash of private data associated with the user device, as discussed elsewhere herein.

As shown by reference numeral 540, process 500 may include comparing, by the infrastructure device, the hash of the private data with the hash of the breached data. For instance, the stateless infrastructure may compare the hash of the private data with the hash of the breached data, as discussed elsewhere herein.

As shown by reference numeral 550, process 500 may include transmitting, by the infrastructure device when the hash of the private data matches the hash of the breached data, a notification to the user device indicating that the private data associated with the user device is compromised due to the data breach. For instance, the stateless infrastructure may utilize the associated communication interface and/or processor/controller to transmit, when the hash of the private data matches the hash of the breached data, a notification to the user device indicating that the private data associated with the user device is compromised due to the data breach, as discussed elsewhere herein.

Process 500 may include additional aspects, such as any single aspect or any combination of aspects described below and/or in connection with one or more other processes described elsewhere herein.

In a first aspect, process 500 may include continuously monitoring, by the infrastructure device, availability of new breach information indicating new breached data that is compromised due to a new data breach.

In a second aspect, alone or in combination with the first aspect, process 500 may include utilizing, by the infrastructure device, a hashing algorithm to calculate the hash of the breached data, and configuring, by the infrastructure device, the user device to utilize the hashing algorithm to calculate the hash of the private data.

In a third aspect, alone or in combination with the first through second aspects, in process 500, receiving the hash of the private data includes the infrastructure device receiving the hash of the private data periodically from the user device.

In a fourth aspect, alone or in combination with the first through third aspects, process 500 may include, prior to receiving the hash of the private data, verifying by the infrastructure device that the user device is authorized to have access to a plaintext version of the private data.

In a fifth aspect, alone or in combination with the first through fourth aspects, in process 500, comparing the hash of the private data with the hash of the breached data includes comparing the hash of the private data with the hash of the breached data based at least in part on determining availability of new breach information.

In a sixth aspect, alone or in combination with the first through fifth aspects, process 500 may include maintaining the breach database based at least in part on updating the breach database to include new breach information.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with a stateless system to enable data breach notification, according to various aspects of the present disclosure. In some aspects, the process 600 may be performed by a memory and/or a processor/controller (e.g., processor 106, processor 720) associated with a user device (e.g., user device 102) executing a client application configured by a stateless infrastructure (e.g., stateless infrastructure 110). As shown by reference numeral 610, process 600 may include calculating, by the user device, a hash of private data, the calculated hash to be utilized by the infrastructure device for comparison with a hash of breached data that is compromised due to a data breach. For instance, the user device may utilize the associated memory and processor to calculate a hash of private data, the calculated hash to be utilized by the infrastructure device for comparison with a hash of breached data that is compromised due to a data breach, as discussed elsewhere herein.

As shown by reference numeral 620, process 600 may include verifying, by the user device prior to transmitting the hash of the private data to the infrastructure device, that the user device is authorized to have access to a plaintext version of the private data. For instance, the user device may utilize the associated memory and processor to verify, prior to transmitting the hash of the private data to the infrastructure device, that the user device is authorized to have access to a plaintext version of the private data, as discussed elsewhere herein.

As shown by reference numeral 630, process 600 may include transmitting, by the user device based at least in part on verifying that the user device is authorized to have access to the plaintext version of the private data, the hash of the private data to the infrastructure device. For instance, the user device may utilize an associated communication interface (e.g., communication interface with the associated memory and processor to transmit, based at least in part on verifying that the user device is authorized to have access to the plaintext version of the private data, the hash of the private data to the infrastructure device, as discussed elsewhere herein.

As shown by reference numeral 640, process 600 may include receiving, by the user device from the infrastructure device based at least in part on transmitting the hash of the private data, a notification indicating a result of a comparison of the hash of the private data with the hash of the breached data. For instance, the user device may utilize the associated communication interface, memory, and processor to receive, based at least in part on transmitting the hash of the private data, a notification indicating a result of a comparison of the hash of the private data with the hash of the breached data, as discussed elsewhere herein.

Process 600 may include additional aspects, such as any single aspect or any combination of aspects described below and/or in connection with one or more other processes described elsewhere herein.

In a first aspect, in process 600, receiving the notification indicating the result of the comparison includes receiving the notification indicating whether the private data is compromised due to the data breach.

In a second aspect, alone or in combination with the first aspect, in process 600, calculating the hash of the private data includes utilizing a hashing algorithm that is utilized to calculate the hash of the breached data.

In a third aspect, alone or in combination with the first through second aspects, in process 600, verifying that the user device is authorized to have access to the plaintext version of the private data includes communicating (e.g., receiving and/or transmitting) a one-time token with the infrastructure device when the user device is to transmit the hash of the private data.

In a fourth aspect, alone or in combination with the first through third aspects, in process 600, the private data is associated with another user device, the user device and the other user device being associated with a single account registered with the infrastructure device.

In a fifth aspect, alone or in combination with the first through fourth aspects, in process 600, verifying that the user device is authorized to have access to the plaintext version of the private data includes transmitting a one-time token that is received by the user device at a time of registration of an account with the infrastructure device.

In a sixth aspect, alone or in combination with the first through fifth aspects, in process 600, transmitting the hash of the private data includes transmitting the hash of the private data periodically.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700, according to various aspects of the present disclosure. In some aspects, the example devices 700 may form part of or implement the systems, environments, infrastructures, components, or the like described elsewhere herein (e.g., FIG. 1 and/or FIG. 2) and may be used to perform the example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An infrastructure device in communication with a user device based at least in part on an authentication of the user device by the infrastructure device, the authentication being based at least in part on communication of access information to access a registered account with the infrastructure device, the infrastructure device comprising:
   a memory; and
   a processor communicatively coupled to the memory, the memory and the processor being configured to:
      determine a breach database including breach information indicating breached data that is compromised due to a data breach;
      calculate a hash of the breached data that is compromised due to the data breach;
      verify, based at least in part on communication of verification information between the infrastructure device and the user device, that the user device has authorized access to a plaintext version of private data associated with the user device, the private data being different from the access information;
      receive, from the user device based at least in part on successful verification that the user device is authorized to have access to the plaintext version of the private data, a hash of the private data associated with the user device;
      compare the hash of the private data with the hash of the breached data; and
      transmit, when the hash of the private data matches the hash of the breached data, a notification to the user device indicating that the private data associated with the user device is compromised due to the data breach.

2. The infrastructure device of claim 1, wherein the memory and the processor are configured to:
   continuously monitor availability of new breach information indicating new breached data that is compromised due to a new data breach.

3. The infrastructure device of claim 1, wherein the memory and the processor are configured to:
   utilize a hashing algorithm to calculate the hash of the breached data, and
   configure the user device to utilize the hashing algorithm to calculate the hash of the private data.

4. The infrastructure device of claim 1, wherein, to receive the hash of the private data, the memory and the processor are configured to receive the hash of the private data periodically from the user device.

5. The infrastructure device of claim 1, wherein the memory and the processor are configured to communicate a one-time token to verify that the user device is authorized to have access to the plaintext version of the private data.

6. The infrastructure device of claim 1, wherein, to compare the hash of the private data with the hash of the breached data, the memory and the processor are configured to compare the hash of the private data with the hash of the breached data based at least in part on determining availability of new breach information.

7. The infrastructure device of claim 1, wherein the memory and the processor are configured to:
   maintain the breach database based at least in part on updating the breach database to include new breach information.

8. A method in an infrastructure device in communication with a user device based at least in part on an authentication of the user device by the infrastructure device, the authentication being based at least in part on communication of access information to access a registered account with the infrastructure device, the method comprising:
   determining, by the infrastructure device, a breach database including breach information indicating breached data that is compromised due to a data breach;
   calculating, by the infrastructure device, a hash of the breached data that is compromised due to the data breach;
   verifying, by the infrastructure device based at least in part on communication of verification information between the infrastructure device and the user device, that the user device has authorized access to a plaintext version of private data associated with the user device, the private data being different from the access information;
   receiving, by the infrastructure device from the user device, a hash of the private data associated with the user device;
   comparing, by the infrastructure device, the hash of the private data with the hash of the breached data; and
   transmitting, by the infrastructure device when the hash of the private data matches the hash of the breached data, a notification to the user device indicating that the private data associated with the user device is compromised due to the data breach.

9. The method of claim 8, further comprising:
   continuously monitoring, by the infrastructure device, availability of new breach information indicating new breached data that is compromised due to a new data breach.

10. The method of claim 8, further comprising:
    utilizing, by the infrastructure device, a hashing algorithm to calculate the hash of the breached data, and
    configuring, by the infrastructure device, the user device to utilize the hashing algorithm to calculate the hash of the private data.

11. The method of claim 8, wherein receiving the hash of the private data includes the infrastructure device receiving the hash of the private data periodically from the user device.

12. The method of claim 8, further comprising:
    communicating a one-time token to verify that the user device is authorized to have access to the plaintext version of the private data.

13. The method of claim 8, wherein comparing the hash of the private data with the hash of the breached data includes comparing the hash of the private data with the hash of the breached data based at least in part on determining availability of new breach information.

14. The method of claim 8, further comprising:
    maintaining the breach database based at least in part on updating the breach database to include new breach information.

15. A non-transitory computer-readable medium configured to store instructions, which when executed by a processor associated with an infrastructure device in communication with a user device based at least in part on an authentication of the user device by the infrastructure device, the authentication being based at least in part on communication of access information to access a registered account with the infrastructure device, configure the processor to:
    determine a breach database including breach information indicating breached data that is compromised due to a data breach;
    calculate a hash of the breached data that is compromised due to the data breach;

verify, based at least in part on communication of verification information between the infrastructure device and the user device, that the user device has authorized access to a plaintext version of private data associated with the user device, the private data being different from the access information;

receive, from the user device, a hash of the private data associated with the user device;

compare the hash of the private data with the hash of the breached data; and transmit, when the hash of the private data matches the hash of the breached data, a notification to the user device indicating that the private data associated with the user device is compromised due to the data breach.

16. The non-transitory computer-readable medium of claim 15, wherein the processor is configured to:
continuously monitor availability of new breach information indicating new breached data that is compromised due to a new data breach.

17. The non-transitory computer-readable medium of claim 15, wherein the processor is configured to:
utilize a hashing algorithm to calculate the hash of the breached data, and
configure the user device to utilize the hashing algorithm to calculate the hash of the private data.

18. The non-transitory computer-readable medium of claim 15, wherein, to receive the hash of the private data, the processor is configured to receive the hash of the private data periodically from the user device.

19. The non-transitory computer-readable medium of claim 15, wherein the processor is configured to communicate a one-time token to verify that the user device is authorized to have access to the plaintext version of the private data.

20. The non-transitory computer-readable medium of claim 15, wherein, to compare the hash of the private data with the hash of the breached data, the processor is configured to compare the hash of the private data with the hash of the breached data based at least in part on determining availability of new breach information.

* * * * *